3,288,726
B-N LINKED BORAZENE DERIVATIVES AND THEIR PREPARATION

Ross I. Wagner, Whittier, Calif., assignor to American Potash & Chemical Corporation, Los Angeles, Calif., a corporation of Delaware
No Drawing. Filed Nov. 30, 1961, Ser. No. 156,155
6 Claims. (Cl. 260—2)

This invention relates in general to novel borazene derivatives and novel methods of preparing these derivatives. More specifically, this invention relates to boron-nitrogen (B-N) linked borazene derivatives.

The desirable properties, particularly the neutron absorption and thermal stability of borazene compounds have long been known. Inorganic polymers prepared from borazene compounds have long been sought because of these valuable properties. However, no acceptable polymer or method for preparing such a polymer has heretofore been available. In particular, no inorganic polymers based upon borazene have been available which direct B-N linkage between borazene rings. Further, no process has been available whereby such polymeric borazene derivatives could be prepared either as linear or cross-linked chains of rings as desired.

Broadly, the B-N linked borazene derivatives according this invention, provide at least two borazene rings joined to one another through a direct B-N linkage between separate borazene rings.

More specifically, B-N linked borazene derivatives of this invention provide borazene rings joined together directly through a B-N bond between annular atoms in separate rings. Annular atoms being defined as those boron and nitrogen atoms which make up the borazene rings. Any number of borazene rings can be joined to one another in this manner. The character of the product is determined by selection of the starting material. Thus, if monofunctional borazene derivatives are used to prepare the B-N linked borazene derivatives of this invention, only two borazene rings will be joined. If di-functional borazene derivatives are chosen as the starting materials, linear B-N linked borazene derivatives will be formed. The use of tri-functional borazene derivatives results in the preparation of a cross-linked B-N borazene derivative. The B-N linked borazene derivatives according to this invention have the formula:

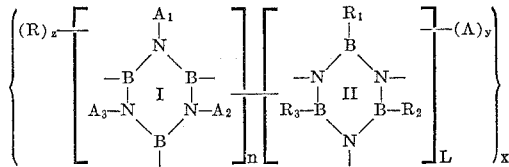

In this formula:

$n$, $L$ and $x$ are integers chosen so that $x(n+L)$ is at least 2 and can be 3000 or more;

$z$ is an integer equal to the number of annular boron atoms in the above Formula I which are not bonded to annular nitrogen atoms in the above Formula II;

$y$ is an integer equal to the number of annular nitrogen atoms in the above Formula II which are not bonded to annular boron atoms in the above Formula I.

The preferred B-N linked borazene derivatives of this invention are polymers, so that in the above formula my preferred derivatives are those in which $x(n+L)$ is at least 3 and can be up to about 300.

In the B-N linked borazene derivatives of this invention the total number of annular boron atoms in Formula I not joined to annular nitrogen atoms of Formula II will be combined with $z$ number of R substituents, and the total number of annular nitrogen atoms of Formula II not joined to annular boron atoms of Formula I will be combined with $y$ number of A substituents.

The substituents R, $R_1$, $R_2$ and $R_3$ can be any of alkyl, alicyclic or arene substituents. In addition to these substituents R can be hydroxy.

The substituents A, $A_1$, $A_2$ and $A_3$ can be any of hydrogen, alkyl, alicyclic or arene substituents.

The substituents R, $R_1$, $R_2$ and $R_3$ can be the same or different on any particular borazene ring and can be the same or different from one borazene ring to another in a given B-N linked borazene derivative. Each R substituent is independently selected for each position on each borazene ring.

The substituents A, $A_1$, $A_2$ and $A_3$ are each independently selected for each position on each borazene ring. The A substituents on a given B-N linked borazene derivative can all be the same or they can all be different.

Broadly, in accordance with the present invention, it has been determined that B-N linked borazene derivatives can be prepared by the reaction of various functional borazene derivatives. The process is applicable to the production of non-polymeric, linear polymeric, cross-linked polymeric and cyclic polymeric B-N linked borazene derivatives.

More specifically, the process of the present invention comprises reacting a metallo borazene derivative having the formula:

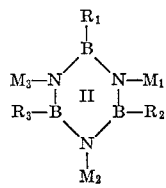

with a halo borazene derivative having the formula:

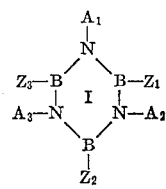

In the above formulas the substituents $Z_1$, $Z_2$ and $Z_3$ can be any of halogen, alkyl, alicyclic or arene substituents; at least one of these substituents being halogen.

The substituents $M_1$, $M_2$ and $M_3$ can be any of hydrogen, alkali metal, alkaline earth metal, aluminum, cadmium, zinc, alkyl, alicyclic or arene substituents; at least one of these substituents being one of the above metals.

While I do not wish to be limited to any theory, apparently the metallic substituent of the metallo borazene derivative and the halogen substituent of the halo borazene derivative combine with one another leaving the halo borazene derivative with an open valance on an annular boron atom and the metallo borazene derivative with an open valance on an annular nitrogen atom so that the two rings can be joined together through these open valances.

Polymeric B-N linked borazene derivatives of any molecular weight can be prepared.

The character of the polymeric materials of this invention can be controlled by adjusting the ratio of tri-functional reactants to di-functional reactants. In general, the greater the proportion of tri-functional reactants the harder and more infusible the polymer. If the proportion of di-functional reactants is increased the polymer becomes more thermoplastic and flexible. Preferably the reactants are provided in stoichrometric amounts since unreacted reactants will hydrolise or react to form undesirable side products.

The molecular weight can be controlled within limits by the addition of mono-functional reactants to a mixture of di- and tri-functional reactants. The greater the proportion of mono-functional material the lower the average molecular weight. End-blocking of the polymer can be accomplished in many ways such as cyclization, reaction with impurities, formation of hydroxyl groups or hydrogen atoms on the annular atoms, or reaction with mono-functional reactants.

Normally the reactions of this invention are carried out in a solvent since generally speaking one or the other of the reactants will be a solid. It becomes very difficult to mix the reactants when a large amount of solid phase is present in the reaction mixture so a solvent is used for the purpose of diluting and dissolving the reaction so that mixing of the reactants will be facilitated.

The solvent used in the reaction medium of the process is not critical, it being only necessary that it be compatible with all the reactants and the product. Particularly useful solvents include: aliphatic ethers such as di-amyl ether, diheptyl ether, isobutyl neopentyl ether, di-isopropyl ether, dimethyl ether, diethyl ether, dipropyl ether, butyl ethyl ether, hexyl methyl ether; arene ethers such as anisole, phenetole, diphenyl ether, veratrole, benzyl phenyl ether, dinaphthyl ether; cyclic ethers such as tetrahydrofuran, dioxane, tetrahydropyran; arene or aliphatic hydrocarbons such as diisoamyl, hexane, n-hexadecane, cyclohexane, iso-octane cyclopentane, trimethylpentane, 2-methylpentane, isopentane, methylcyclohexane, benzene, octadecylclohexane, naphthalene, toluene, P-xylene, naphtha, butylbenzene, ethylbenzene, cumene, octadecylbenzene, etc.

Mixtures of solvents can be employed if desired. The aliphatic ether solvents are particularly useful because they are good solvents for the reactants and product. They are inexpensive and readily available.

The reactions to this invention are generally conducted under anhydrous conditions to avoid the formation of borazene oxide derivatives. These derivatives are readily formed by the hydrolysis of the halo borazenes used in this invention, as more specifically described in assignee's co-pending application Serial No. 156,521, filed December 1, 1961.

Cooling and heating steps can be provided in the process as desired. The temperature at which the reaction takes place is not critical. The effect of varying the reaction temperature is a corresponding increase or decrease in the rate of reaction. Since the reaction is almost instantaneous at room temperature, it is often desirable to operate at about this temperature since this eliminates the problem of special equipment to contain and maintain either hot or cold reactants.

The reaction of this invention can be carried out at any temperature between the boiling and freezing points of the reaction mixture. Generally these temperatures are between about −50° C. and about 100° C.

Preferably the reaction of this invention is carried out between about 0° C. and about 50° C. Below this temperature range the solubilities of the reactants generally decrease rapidly and above this temperature the metallo borazene derivative tends to decompose.

The reaction can be conducted at atmospheric, sub-atmospheric or super-atmospheric pressure as desired without any substantial effect on the course of the reaction.

The B–N linked borazene derivatives are recovered from the reaction either as precipitates or as soluble components in the reaction medium. Conventional techniques for the recovery of either soluble components or precipitates as are well understood by the art can be used to recover these materials. Such techniques include centrifuging, filtering, evaporation, etc.

One particularly desirable method for the preparation of the halo borazene derivatives of this invention is that described in assignee's co-pending application Serial No. 156,534, filed December 1, 1961, now abandoned, and involves heating hydrogen halide in contact with a borazene derivative having at least one annular boron atom which has hydrogen attached to it.

While the above identified application refers specifically to the preparation of mono- and di-functional derivatives, tri-functional derivatives will be produced if certain critical conditions are not maintained as is more fully described in the above application.

A particularly desirable method for the preparation of the metallo borazene derivatives used in this invention is that described in assignee's co-pending application Serial No. 156,156, filed November 30, 1961. The procedure described in the above identified application involves the reaction of an organometallic and a borazene derivative having at least one annular nitrogen atom which has hydrogen attached to it.

The B–N linked borazene derivatives of this invention range from crystalline solids to liquids or glasses in their normal state under ambient conditions. Some of the polymeric derivatives are tough flexible materials while others are brittle hard materials. These derivatives are used, for example, as components in fire resistant compositions, plasticizers, fuel additives, neutron absorbers, moulding composition extenders, laminating resins, high-temperature insulation, heat transfer medium, films, filaments, moulded articles, etc.

In the following examples anhydrous conditions were maintained unless otherwise indicated.

In the specification, claims and following examples all parts and percentages are by weight unless otherwise specified. The following examples are submitted to illustrate and not to limit this invention.

*Example I*

A diethyl ether solution containing 0.2745 g. (1.483 mmoles) of pentamethyl-B-chloroborazene dissolved in 1.5 ml. of diethyl ether is syringed into a nitrogen filled 6 ml. bomb tube containing about 1.4 mmoles of N-lithiopentamethylborazene. Care is taken to maintain anhydrous conditions. The reactants are mixed at about 20° C. Gentle agitation produces cloudiness and the evolution of heat. To complete the reaction the mixture is shaken vigorously and then centrifuged to separate the precipitate. The solids are isolated, washed with 1 ml. of diethyl ether and vacuum dried to yield 0.1300 g. of fine powder which proves upon analysis to be primarily LiCl. The ether solution which is separated from the solids is evaporated to dryness. The residue from this evaporation is extracted with petroleum ether (B.R. 30–60° C.) leaving 0.0993 g. of fine powder which is primarily LiI. The lithium iodide is present as an inert impurity in the methyllithium starting material. The petroleum ether extract is evaporated to dryness and sublimed at 50° C. to yield 0.0490 g. (0.265 mmole, 17.8%) of unreacted pentamethyl-B-chloroborazene. Sublimation at 100° C. yields 0.2324 g. of sublimate and 0.1072 g. of residue. The sublimate is recrystallized from iso-propylamine and resublimed at 100° C. to yield 0.1840 g. (0.1617 mmole, 42%) of needles, M.P. 172–174° C. The calculated analysis for decamethyl - N,B' - biborazyl ($C_{10}H_{30}B_6N_6$) is: C, 40.13; H, 10.10 and M.W. 299.3. These needles are found to have the following analysis: C, 40.05; H, 10.19 and M.W. 291.8. The product is identified as decamethyl-N,B'-biborazyl.

This example is repeated without taking precautions to exclude water. The only identifiable product is decamethyl-B,B'-diborazyl oxide formed by the hydrolysis of the pentamethyl-B-chloroborazene.

*Example II*

A diethyl ether solution containing 1.8674 g. (10.09 mmoles) of pentamethyl-B-chloroborazene is added to a diethyl ether solution of N-dilithotetramethylborazene prepared by the reaction of 0.6892 g. (5.044 mmoles) of N-methyl-B-trimethylborazene and 10.1 mmoles of methyllithium. After the reaction is complete the techniques of solvent exchange and high vacuum sublimation at a series of ascending temperatures gives the following products:

(1) at 50° C., 0.3313 g., M.P. 85–95° C.;
(2) at 100° C., 0.3204 g., M.P. 103–117° C.;
(3) at 140° C., 1.2724 g., M.P. 192–206° C.

The last fraction (3) is resublimed first at 120° C., to deliver 0.1151 g., M.P. 141–196° C., and then at 140° C. to obtain 1.0190 g., M.P. 196–209° C. This product is recrystallized from iso-propylamine followed by resublimation at 140° C. to produce 0.6074 g. (1.400 mmoles, 27.8%) of a product identified as 1,3-bis(pentamethyl-2'-borazyl)-2,4,5,6 - tetramethylborazene. The product has a melting point of 207–210° C. The calculated values for $C_{14}H_{42}B_9N_9$ are: C, 38.75; H, 9.76 and M.W. 433.9. Upon anaylsis the product is found to have these values: C, 39.04; H, 9.77 and M.W. 433.9.

*Example III*

A diethyl ether solution containing 1.0045 g. (4.887 mmoles) of tetramethyl-B-dichloroborazene is reacted with a diethyl ether solution of N-lithiopentamethylborazene. The N-lithiopentamethylborazene is prepared by the reaction of 1.5122 g. (10.04 mmoles) of N-dimethyl-B-trimethylborazene and 9.79 mmoles of methyllithium. The solvent extracted solid product of the reaction between the haloborazene and metalloborazene derivatives is sublimed to obtain (at 100° C.) 0.2470 g. of solid, M.P. 100–111° C.; and (at 150° C.) 1.1144 g. of solid. This latter sublimate is recrystallized from iso-propylamine followed by resublimation at 100° C. to remove 0.545 g. of syrupy unidentified material and finally at 140° C. to obtain 0.5550 g. (1.279 mmoles, 26.2%) of a product identified as 1,3,5,6-tetramethyl - 2,4-bis(pentamethyl-1'-borazyl)borazene. The M.P. of this product is 135–138° C. The calculated analysis of $C_{14}H_{42}B_9N_9$ is: C, 38.75; H, 9.76 and M.W. 433.9. This product is found to have the following values: C, 39.13; H, 9.79 and M.W 443.0.

*Example IV*

A diethyl ether solution containing 0.7626 g. (3.39 mmoles) of N-trimethyl-B-trichloroborazene is reacted with a diethyl ether solution of N-lithiopentamethylborazene. The N-lithiopentamethylborazene is prepared by the reaction of 1.5340 g. (10.18 mmoles) of N-dimethyl-B-trimethylborazene and 10.3 mmoles of methyllithium. The solid precipitate from this reaction of the haloborazene and metalloborazene derivatives is removed and the solvent is evaporated to dryness. This residue obtained from this evaporation of the solvent extract is sublimed to give, during three hours at 175° C., 0.9030 g. (1.59 mmoles, 46.9% yield) of a glassy sublimate M.P. 189–229° C. A single recrystallization from methylamine in a Schlenk tube yields needles, M.P. 235–245° C. The calculated analysis for 1,3,5-trimethyl-2,4,6-tris(pentamethyl-1'-borazyl)borazene ($C_{18}H_{54}B_{12}N_{12}$) is: C, 38.03; H, 9.57; M.W. 568.5. The values found for this product are: C, 38.29; H, 9.72 and M.W. 593.2.

*Example V*

N-dilithiotetramethylborazene, prepared from 0.6916 g. (5.061 mmoles) of N-methyl-B-trimethylborazene and 10.16 mmoles of methyllithium in 25 ml. of diethylether, is treated with 1.0417 g. (5.068 mmoles) of tetramethyl-B-dichloroborazene dissolved in 10 ml. of diethyl ether. The solid reaction products are separated and the remaining solution is evaporated to dryness, redissolved in petroleum ether and again evaporated to dryness and freed of solvent by heating at 150° C. under high vacuum. The resulting clear yellow resin weighs 1.3128 g. (96.5% yield) and has a wide melting range of 140–160° C. The molecular weight of this product is determined to be 1356. A large part of this product is reheated under high vacuum to 215° C. at which temperature a very small amount of viscous material is removed. The residual material has a molecular weight of 1382, corresponding to a degree of polymerization (D.P.) of 5 or a chain of 10 rings. The melting point range of this product is 163–168° C. (softens 155° C.). The calculated values for poly(1',2,3',4,5,5',6,6'-octamethylbiborazylene), $(C_4H_{12}B_3N_3)_n$, is: C, 35.69; H, 8.98; B, 24.11; N, 31.22; M.W. $(134.62)_n$. The values found for this product are: C, 34.91; H, 8.90; B, 22.3; N, 29.1; M.W., 1382.

Following the procedures substantially as set forth in Example I, employing the haloborazene, pentamethyl-B-fluoroborazene, a product identified as decamethyl-N,B'-biborazyl is produced.

The procedures of Example I are followed in the reaction of the haloborazene pentamethyl-B-iodoborazene with N-sodiopentamethylborazene to produce decamethyl-N,B'-biborazyl.

The procedures of Example I are followed using N-cesiopentamethylborazene to produce the product decamethyl-N,B'-biborazyl.

The product decamethyl-N,B'-biborazyl is produced according to the procedures of Example I using the metalloborazene N-rubidiopentamethylborazene.

The reaction of pentamethyl-B-bromoborazene with N - (chloromagnesio)pentamethylborazene to produce decamethyl-N,B'-biborazyl is carried out substantially according to the procedures of Example I.

The reaction, substantially according to the procedures of Example I, of pentamethyl-B-iodoborazene with N-zinc-pentamethylborazene in a molar ratio of 2:1 produces the product decamethyl-N,B'-biborazyl.

A product 1,3,5,6-tetramethyl-2,4-bis(pentamethyl-1'-borazyl)borazene is produced by the reaction of tetramethyl-B-dibromoborazene with N-berylliopentamethylborazene substantially according to the procedures of Example I.

The reaction of tetramethyl-B-dichloroborazene with N - calciopentamethylborazene following the procedures of Example I produces 1,3,5,6-tetramethyl-2,4-bis(pentamethyl-1'-borazyl)borazene.

The reaction of tetramethyl-B-diiodoborazene with N-strontiopentamethylborazene produces 1,3,5,6-tetramethyl - 2,4 - bis(pentamethyl-1'-borazyl)borazene when the procedures of Example I are followed.

The product 1,3,5,6-tetramethyl-2,4-bis(pentamethyl-1'-borazyl)borazene is obtained by the reaction of tetramethyl-B-dibromoborazene with N-magnesiopentamethylborazene following the procedures of Example I.

The reaction of tetramethyl-B-dichloroborazene with N-bariopentamethylborazene produces 1,3,5,6-tetramethyl-2,4-bis-(pentamethyl-1'-borazyl)borazene according to the procedures of Example I.

The reaction of tetramethyl-B-diiodoborazene with N-cadmiopentamethylborazene, following the procedures of Example I, produces 1,3,5,6-tetramethyl-2,4-bis(pentamethyl-1'-borazyl)borazene.

The product 1,3,5-trimethyl-2,4,6 tris(pentamethyl-1'-borazyl)borazene is produced by the reaction of N-trimethyl-B-trichloroborazene with N-aluminopentamethylborazene according to the procedures of Example I.

The procedures of Example I are followed to produce the product decamethyl-N,B'-biborazyl except that the solvent dimethyl ether is used and the reaction temperature is −50° C.

A thermoplastic polymer is produced by the reaction of N-triphenyl-B-isobutyl-B-dibromoborazene with N-dilithiotetramethylborazene at a temperature of 70° C. according to the procedure of Example V.

The reaction of N-tridodecyl-B-dimethyl-B-chloroborazene with N-dilithiotetramethyl borazene at a temperature of 50° C. in a solution of diisooctyl ether, following the procedures of Example II, produces 1,3-bis-(1',3',5'-tridodecyl-4',6'-dimethyl - 2' - borazyl)-2,4,5,6-tetramethylborazene.

The product 2,4-bis(2',4',6'-triisopropyl-3',5'-dimethyl-1'-borazyl)-1,3,5-tricyclohexyl-6-methylborazene is produced by the reaction of N-tricyclohexyl-B-methyl-B-diiodoborazene with N-potassio-N-dimethyl-B-triisopropylborazene in a solution of hexane at a temperature of 80° C.

A solvent mixture consisting of equal parts by weight of hexane and diisoamyl ether is used, following the procedures of Example III, with the reactant N-trimethyl-B-phenyl-B-dichloroborazene to produce the product 1,3,5-trimethyl - 6 - phenyl - 2,4-bis(pentamethyl-1'-borazyl)-borazene.

The reaction, according to the procedures of Example III, of N-trimethyl-B-cyclopentyl-B-dichloroborazene with N-lithio-N-dimethyl - B - trihexylborazene produces the product 1,3,5-trimethyl - 6 - cyclopentyl-2,4-bis(3',5'-dimethyl-2',4',6'-trihexyl-1'-borazyl)borazene.

The reaction of N-isobutyl-N-dimethyl-B-methyl-B-dichloroborazene with N-lithio-N-diphenyl-B-cyclopentyl-B-dimethylborazene according to the procedures of Example III produces 1-isobutyl-3,5,6-trimethyl-2,4-bis-(2',6' - dimethyl-4'-cyclopentyl-3',5'-diphenyl-1'-borazyl)-borazene.

The reaction of N-triisopropyl-B-triidoborazene with N-lithio-N-dicyclohexyl-B-trimethylborazene in a solution of cyclohexane according to the procedures of Example IV produces 1,3,5-triisopropyl-2,4,6-tris(2',4',6'-trimethyl-3',5'-dicyclohexyl-1'-borazyl)borazene.

The product 1-biphenylyl-2,4,6-tris(2',4',6'-trimethyl-3',5'-dipentyl-1'-borazyl)borazene is produced according to the procedures of Example IV by reacting N-biphenylyl-B-tribromoborazene with N-lithio-N-dipentyl-B-trimethyl-borazene.

The reaction according to the procedures of Example V of N-trimethyl-B-tribromoborazene with N-trilithio-B-trimethylborazene in a molar ratio of 1:1 produces a hard infusible polymer.

The reaction of N-trimethyl-B-triiodoborazene with N-dipotassio-B-trimethylborazene according to the procedures of Example V produces a tough infusible polymer.

A hard infusible polymer is produced according to the procedures of Example V by the reaction of N-trimethyl-B-tribromoborazene and N-dilithiotetramethylborazene in a molar ratio of 2:3.

The reaction of N-trimethyl-B-triiodoborazene with N-dilithiotetramethylborazene in a molar ratio of 2:3, according to the procedures of Example V, produces a thermoset polymer.

A tough, flexible insoluble polymer is produced, according to the procedures of Example V, by the reaction of N-trimethyl-B-trichloroborazene, tetramethyl-B-dibromoborazene, N-dilithiotetramethylborazene and N-potassio-pentamethylborazene in the molar ratios of 1:6:7:1.

A hard infusible polymer is produced by the reaction, according to the procedures of Example V, of N-trimethyl-B-tribromoborazene, N-disodiotetramethylborazene and N-lithiopentamethylborazene in a molar ratio of 5:6:3.

The alkyl, alicyclic or arene substituents can be, according to the definitions above, any of R, $R_1$, $R_2$, $R_3$, A, $A_1$, $A_2$, $A_3$, $Z_1$, $Z_2$, $Z_3$, $M_1$, $M_2$ or $M_3$. Illustrative of these alkyl, alicyclic and arene radicals but not all-inclusive thereof are the following: alkyl substituents such as ethyl, methyl, iso-amyl, neopentyl, decyl, hexyl, propyl, 2-methylpentyl, 5-methylhexyl, pentyl, dodecyl, butyl; alicyclic substituents such as cyclopentyl, cyclohexyl, cyclopropyl, P-methylcyclohexyl, 3-butylcyclopentyl, 3,5-diethylcyclohexyl, cyclobutyl; arene substituents such as 2,4-xylyl, m-cumenyl, phenyl, 2-methoxyphenyl, mesityl, biphenyl, naphthyl, indanyl, tolyl, etc.

The alkyl, alicyclic and arene substituents of this invention preferably have between 1 and 12 carbon atoms.

Substituents having more than 12 carbon atoms tend to cause such steric hindrance that reactions become difficult to carry out.

At least one of the substituents $Z_1$, $Z_2$ and $Z_3$ must be a halogen atom. Useful halogen atoms include fluorine, chlorine, bromine, and iodine. Preferably the halogens chlorine, bromine and iodine are used because these compounds are easier to work with than the fluorine compounds.

At least one of the substituents $M_1$, $M_2$ or $M_3$ must be any of alkali metal, alkaline earth metal, aluminum, cadmium, or zinc. The useful alkali metals include lithium, sodium, potassium, rubidium or cesium and the useful alkaline earth metals include beryllium, calcium, strontium, magnesium or barium. Preferably alkali metals are used because they produce the best yields of B–N linked borazene derivatives. Also, alkali metals do not form the complex compounds having more than one borazene ring attached to the same metallic functional substituent such as may be formed by the multi-valent metallic functional substituents. Lithium substituents have been found particularly desirable because the lithioborazene derivatives are very reactive so as to yield B–N linked derivatives readily.

The compounds set forth below are illustrative of the B–N linked borazene derivatives of this invention but are not all-inclusive thereof. In the following formulas the borazene ring has been represented thusly

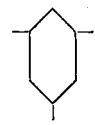

with only the open valances on the annular atoms which are joined to one another being shown. It will be understood that the other annular atoms will also carry substituents but for the sake of simplicity these substituents are not shown.

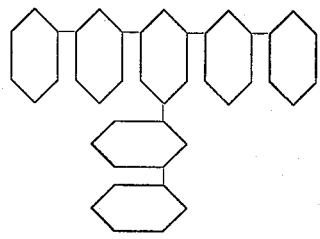

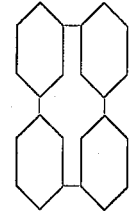

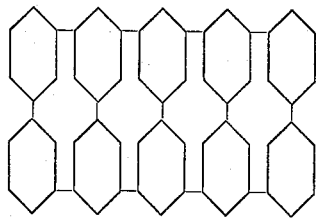

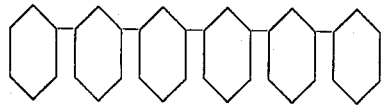

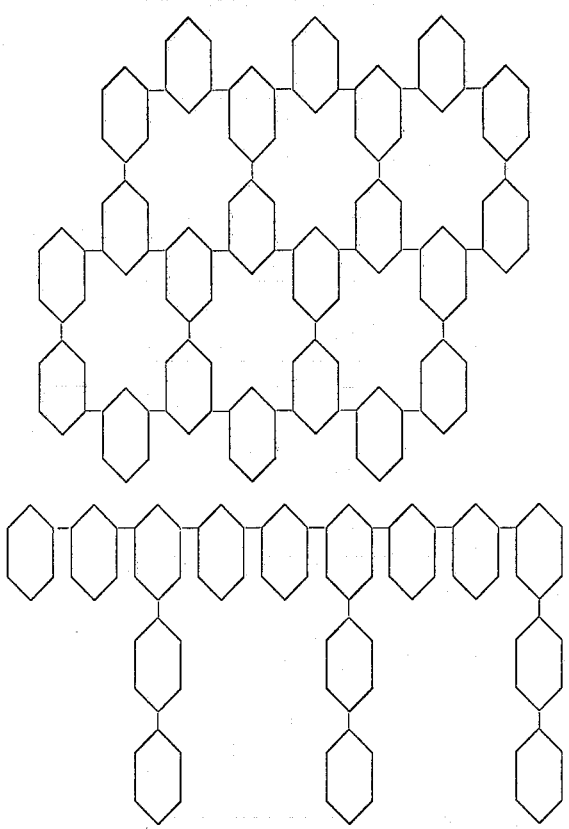

As will be understood by those skilled in the art various specific compounds of this invention can be composed of random combinations of the above structures.

Specific examples of the halo borazene derivatives employed in the process of this invention include but are not limited to the following:

N-cyclohexyl-B-dihexyl-B-chloroborazene,
B-cyclohexyl-B-difluoroborazene,
B-methyl-B-ethyl-B-chloroborazene,
B-dimethyl-B-fluoroborazene,
B-dineopentyl-B-chloroborazene,
B-dipropyl-B-bromoborazene,
B-octyl-B-diiodoborazene,
B-cyclopentyl-B-dibromoborazene,
B-diphenyl-B-iodoborazene,
B-biphenyl-B-dichloroborazene,
B-dodecyl-B-dichloroborazene,
B-ethyl-B-difluoroborazene,
B-methyl-B-cyclopentyl-B-chloroborazene,
B-isopropyl-B-phenyl-B-bromoborazene,
B-cyclohexyl-B-totyl-B-iodoborazene,
N-trimethyl-B-ethyl-B-chloroborazene,
N-ethyl-B-ethyl-B-dibromoborazene,
N-phenyl-B-diphenyl-B-iodoborazene,
N-dicyclohexyl-B-cyclohexyl-B-difluoroborazene,
N-triphenyl-B-methyl-B-diiodoborazene,
N-methyl-N-ethyl-N-propyl-B-butyl-B-pentyl-B-chloroborazene,
B-trichloroborazene,
B-tribromo-N-trimethylborazene, and
B-triiodo-N-tricyclohexylborazene.

Specific examples of the metallo borazene derivatives employed in the process of this invention include but are not limited to the following:

N-lithio-B-tripropylborazene,
N-dilithio-B-tricyclohexylborazene
N-dilithio-B-trioctylborazene,
B-tricyclopentyl-N-borazyl calcium derivative,
N-disodio-B-triphenylborazene,
N-rubidio-B-tricumenylborazene,
N-dipotassio-B-tribiphenylborazene,
N-tripotassio-B-tripentylborazene,
B-trimethyl-N-borazyl strontium derivative,
N-dicesio-B-triethylborazene,
B-tricyclobutyl-N-borazyl aluminum derivative,
N-di(chloromagnesio)-B-tribiphenylborazene,
B-triethyl-N-borazyl cadmium derivative,
N-dirubidio-B-trimethylborazene,
B-tributyl-N-borazyl barium derivative,
B-tricyclopentyl-N-borazyl zinc derivative,
N-sodio-B-methyl-B-dicyclohexylborazene,
N-tripotassio-B-trineopentylborazene,
N-iodomagnesio-B-butyl-B-dicyclopentylborazene,
N-bromomagnesio-B-ethyl-B-diphenylborazene,
N-fluoromagnesio-B-ethyl-B-cyclohexyl-B-phenyborazene,
N-trisodio-B-trinaphthylborazene,
B-tripentyl-N-borazyl magnesium derivative,
N-dilithio-N-propyl-B-diphenyl-B-cyclohexylborazene,
N-lithio-B-tridodecylborazene,
N-sodio-N-methyl-B-trineopentylborazene,
N-potassio-N-lithio-B-trimethylborazene,
B-trimethyl-N-borazylene dicalcium derivative, and
B-tripropyl-N-borazylyne trialuminum derivative.

As will be understood by those skilled in the art, what has been described is the preferred embodiment of the invention, however, many modifications, changes and substitutions can be made therein without departing from the scope and the spirit of the following claims.

I claim:

1. A linear B–N linked borazene derivative having the formula:

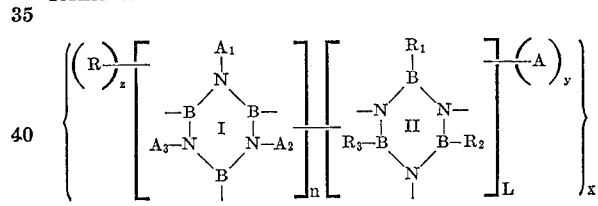

wherein:

R, $R_1$, $R_2$ and $R_3$ are each independently selected from the group consisting of hydroxy, phenyl, cyclohexyl, cyclopentyl, and alkyl substituents, said alkyl substituents containing from 1 to 12 carbon atoms;

A, $A_1$, $A_2$ and $A_3$ are each independently selected from the group consisting of hydrogen, phenyl, cyclohexyl, cyclopentyl, and alkyl substituents, said alkyl substituents containing from 1 to 12 carbon atoms;

$n$, L and $x$ are integers chosen so that $x(n+L)$ is from 2 to 3,000;

$z$ is an integer equal to the number of annular boron atoms in said Formula I not linked to annular nitrogen atoms in said Formula II;

$y$ is an integer equal to the number of annular nitrogen atoms in said Formula II not linked to annular boron atoms in said Formula I;

$n$ being equal to L.

2. Poly (1', 2, 3', 4, 5, 5', 6, 6'-octamethylbiborazylene).

3. 1, 3, 5-trimethyl-2, 4, 6-tris(pentamethyl-1'-borazyl)-borazene.

4. 1, 3, 5, 6-tetramethyl-2, 4-bis(pentamethyl-1'-borazyl)borazene.

5. 1, 3-bis(pentamethyl-2'-borazyl)-2,4,5,6-tetramethylborazene.

6. Method of producing linear B–N linked borazene derivatives which comprises admixing and reacting, under substantially anhydrous conditions, in a molar ratio of 1:1 haloborazene derivative having the formula:

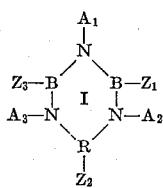

with metalloborazene derivative having the formula:

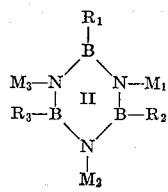

wherein;

$A_1$, $A_2$ and $A_3$ are each independently selected from the group consisting of hydrogen, phenyl, cyclohexyl, cyclopentyl, and alkyl substituents, said alkyl substituents containing from 1 to 12 carbon atoms;

$R_1$, $R_2$ and $R_3$ are each independently selected from the group consisting of phenyl, cyclohexyl, cyclopentyl, and alkyl substituents, said alkyl substituents containing from 1 to 12 carbon atoms;

$Z_1$, $Z_2$ and $Z_3$ are each independently selected from the group consisting of halogen, phenyl, cyclohexyl, cyclopentyl, and alkyl substituents, said alkyl substituents containing from 1 to 12 carbon atoms;

two of said substituents $Z_1$, $Z_2$ and $Z_3$ being halogen;

$M_1$, $M_2$ and $M_3$ are each independently selected from the group consisting of phenyl, cyclohexyl, cyclopentyl, alkyl substituents containing from 1 to 12 carbon atoms, hydrogen, alkali metal, alkaline earth metal, aluminum, cadmium and zinc substituents;

two of said substituents $M_1$, $M_2$ and $M_3$ being selected from the group consisting of alkali metal, alkaline earth metal, aluminum, cadmium and zinc substituents;

and recovering linear B–N linked borazene derivatives.

References Cited by the Examiner

Wagner et al.: Inorganic Chemistry, vol. 1, pages 99 to 106, February 1962.

JOHN D. RANDOLPH, *Primary Examiner.*

IRVING MARCUS, WALTER A. MODANCE, JOSEPH W. MOLASKY, *Assistant Examiners.*